United States Patent
Grover et al.

(10) Patent No.: US 7,185,344 B2
(45) Date of Patent: Feb. 27, 2007

(54) METHOD OF PORTING SOFTWARE

(75) Inventors: Rejeev Grover, Rocklin, CA (US); John Nolan, Sacramento, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 766 days.

(21) Appl. No.: 10/390,121

(22) Filed: Mar. 14, 2003

(65) Prior Publication Data

US 2005/0076340 A1    Apr. 7, 2005

(51) Int. Cl.
*G06F 13/00* (2006.01)
(52) U.S. Cl. ........................ 719/319; 719/310
(58) Field of Classification Search ............... 719/310, 719/319, 329; 717/106, 108, 118, 148, 159
See application file for complete search history.

(56) References Cited

U.S. PATENT DOCUMENTS

| | | | |
|---|---|---|---|
| 6,018,628 A * | 1/2000 | Stoutamire | 717/147 |
| 6,356,957 B2 | 3/2002 | Sanchez, II et al. | |
| 6,832,214 B1 * | 12/2004 | Nguyen | 706/15 |
| 6,957,439 B1 * | 10/2005 | Lewallen | 719/328 |
| 6,964,053 B2 * | 11/2005 | Ho et al. | 719/319 |
| 2003/0145123 A1 * | 7/2003 | Berndt et al. | 709/310 |
| 2004/0064826 A1 * | 4/2004 | Lim et al. | 719/319 |

* cited by examiner

*Primary Examiner*—William Thomson
*Assistant Examiner*—Andy Ho (57) ABSTRACT

Embodiments of the present invention provide a method of porting software. The method of porting software comprises receiving a set of code operable in a first operating environment. The method further comprises converting the set of code into a class. The method further comprises providing the converted set of code operable in a second operating environment.

20 Claims, 7 Drawing Sheets

```
/* Small program that uses global variables and fork()    */
/* Note: multiple users can use this program because each one gets
         there own instance of the program.  There are no conflicts
         with global variables                                   */

/* global vars to hold data */
int result;
char answer;
int pid;
void main(void)  { while(1)  {
      /* see if user wants to use the program   */
      /* function  blocks till user types y or n */
      /* other input is discarded               */
      answer = doYouWantToUseThisProgram();
      if('y' == answer)   {

/* spawn new process to handle processing   */
         pid = fork()
         if (0 == pid)  {
            /* we are the child.  Get to work!  */
            /* routine gets two number from user     */
            /* adds them and stores result in result */
            addum();

/* print result  */
            printf ("%d",result);  }

/* routine gets two number from user     */
            /* adds them and stores result in result */
            addum();
            /* print result  */
            printf ("%d",result);
            exit 0;
         }
         else  {
            /* we are the parent - loop around and check for users */
            /*
         }
      }
   }
}
void addum(void) {
   int num1;
   int num2;

num1 = getNum1FromUser();
   num2 = getNum2FromUser();
   result = num1+num2;
   return;
}
```

FIGURE 5A

```
// Encapulating into a class to ease port to multi-threaded enviroment
Class Addum()   {
  public:
     int result;
     char answer;
     void addum(void);
} void Addum::addum(void) {
  int num1;
  int num2;

num1 = getNum1FromUser();
  num2 = getNum2FromUser();
  result = num1+num2;
  return;
}

Eases port to non-forking enviroments.

process 1

Addum gAddum1;
  ...

gAddum1.answer = doYouWantToUseThisProgram();
  if('y' == gAddum1.answer)   {
    gAddum1.addum();
    /* print result  */
    printf ("%d",gAddum1.result); }
  } process 2

Addum gAddum2;
  gAddum.answer = doYouWantToUseThisProgram();
  if('y' == gAddum.answer)   {
    gAddum.addum();
    /* print result  */
    printf ("%d",gAddum.result);
  }
```

METHOD OF PORTING SOFTWARE

FIELD OF THE INVENTION

Embodiments of the present invention relate to porting an application between a first operating environment and a second operating environment, and more particularly to porting open source code to operation in a VxWorks operating environment.

BACKGROUND OF THE INVENTION

Various operating systems differ in their implementation of multi-tasking. Such differences may necessitate re-writing of an application when moving an application from one operating system to another. One such difference is whether a task namespace, for variable, is private to a task or is shared among all active tasks in the operating system.

Figure 1:
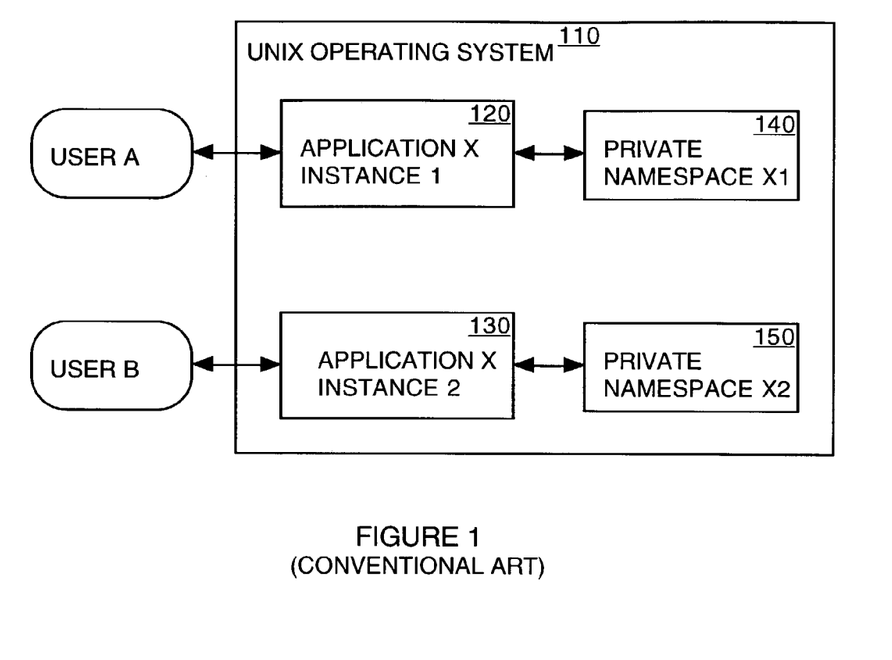
FIG. 1 shows a block diagram of a Unix operating system 110 providing multitasking according to the conventional art.

Referring to FIG. 1, a block diagram of a Unix operating system 110 providing multitasking according to the conventional art is shown. As depicted in FIG. 1, a plurality of instances of an open source application 120, 130, task, process, or the like, may be executing simultaneously with each other. Each instance of the application 120, 130 will have a private namespace 140, 150. Thus, the highest scope of a variable and/or function is limited to the application, task, or process level.

In Unix, a namespace is created for each application, which is separate from other application namespaces. As a result, each instance of an application has its own copy of a global variable. A particular global variable is only visible to the process that declared it. Applications are not allowed to read or write to the namespace of another application.

Therefore, a plurality of users can each run an instance of an application simultaneously. Each instance of the application will have a namespace associated with the particular instance of the application. Thus, for example, each user will receive back the result corresponding to their respective input.

Figure 2:
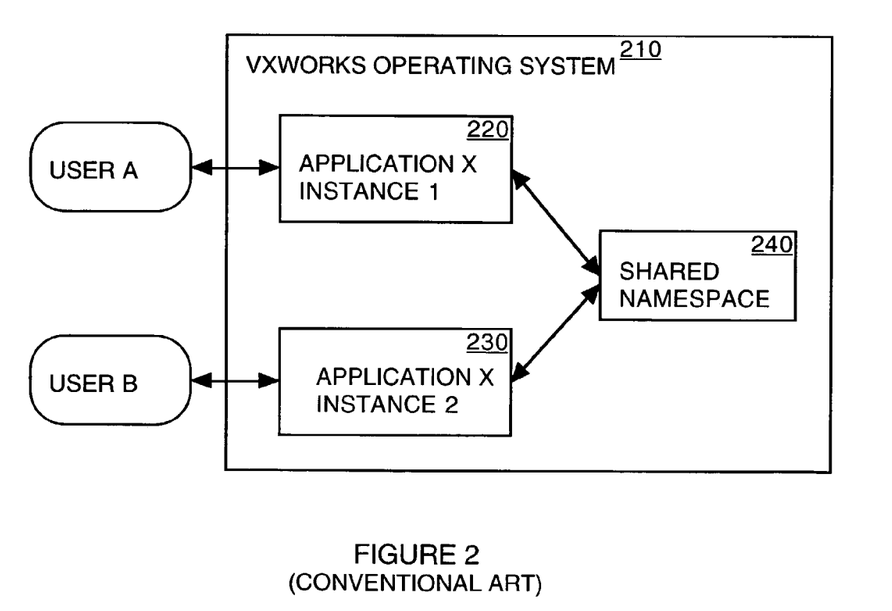
FIG. 2 shows a block diagram of a VxWorks operating system 210 providing multitasking according to the conventional art.

Referring now to FIG. 2, a block diagram of a VxWorks operating system 210 providing multitasking according to the conventional art is shown. As depicted in FIG. 2, a plurality of instances of an open source application 220, 230, task, process, or the like, may be executing simultaneously with each other. Each instance of the application 220, 230 will share a common namespace 240. Thus, the highest scope of a variable can be the whole operating system. As a result, an application written in open source for Unix will not run properly if simply compiled to operate in VxWorks.

In VxWorks, a global variable, function and the like, are visible to all applications, tasks, processes and the like running on the system, even if it is a copy of the same task (e.g., two copies of a telnet protocol, a secure shell protocol, or the like). Multiple copies of a variable and/or function are not created. Therefore, multiple instances of the application all use the same variable and/or function, and hence the same namespace. The memory space, providing for the namespace, is rewritten over by each user.

Hence, multiple instances of unmodified open source code will not run properly in VxWorks. For example, each user will receive the result corresponding to the most recently entered input, even though there is distinct results for each user's input.

Figure 3:
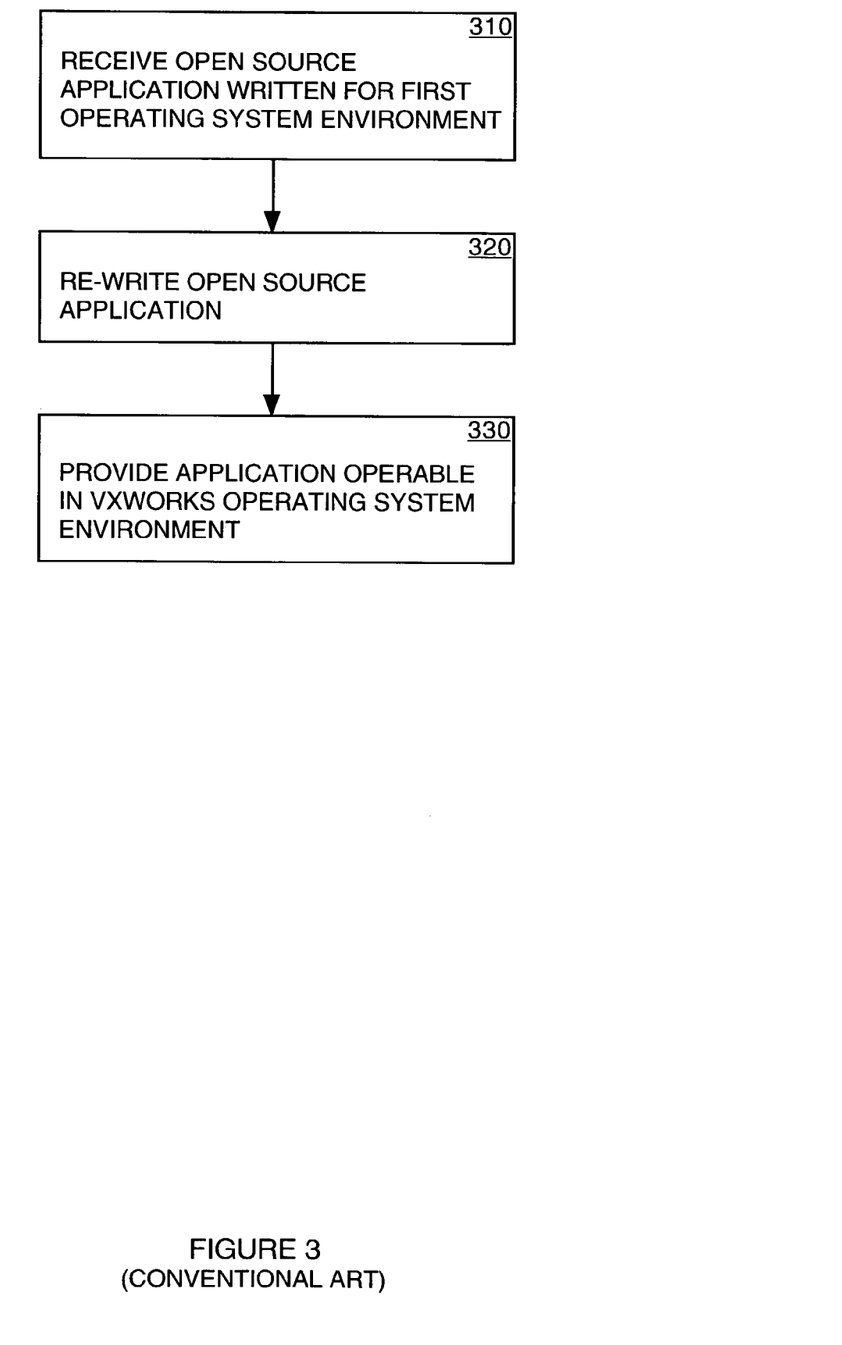
FIG. 3 shows a flow diagram of a method of porting an open source application to a VxWorks operating environment according to the conventional art.

Referring now to FIG. 3, a flow diagram of a method of porting an open source application to a VxWorks operating environment, according to the conventional art, is shown. As depicted in FIG. 3, the method comprises receiving an open source application, at step 310. The open source application is partially or full re-written, at step 320. Thereafter, the application is operable in a VxWorks operating system environment, at step 330.

Porting code from a Unix operating system to a VxWorks operating system is problematic. The prior art method of changing a program in order to run it in a different operating environment, such as from Unix to VxWorks, is disadvantageous in that the software code of the application needs to be fully or partially re-written. As a result, most of the application has to be rewritten to conform to VxWorks. All the code to be ported from Unix to VxWorks has to be re-written resulting in extensive changes. Hence, a large number of man-hours are spent re-coding. Deficiencies in the re-coding may also result in failure of certain features.

Thus, there is a need for an improved method of porting an open source application to work in a VxWorks operating environment. The method should substantially reduce the amount of code that needs to be re-written.

SUMMARY OF THE INVENTION

Embodiments of the present invention provide a method of porting software. In one embodiment, the method of porting software comprises receiving a set of code operable in a first operating environment. The method further comprises converting the set of code into a class. The method further comprises providing the converted set of code operable in a second operating environment.

BRIEF DESCRIPTION OF THE DRAWINGS

The present invention is illustrated by way of example and not by way of limitation, in the figures of the accompanying drawings and in which like reference numerals refer to similar elements and in which.

Prior Art

Prior Art

Prior Art

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 4:
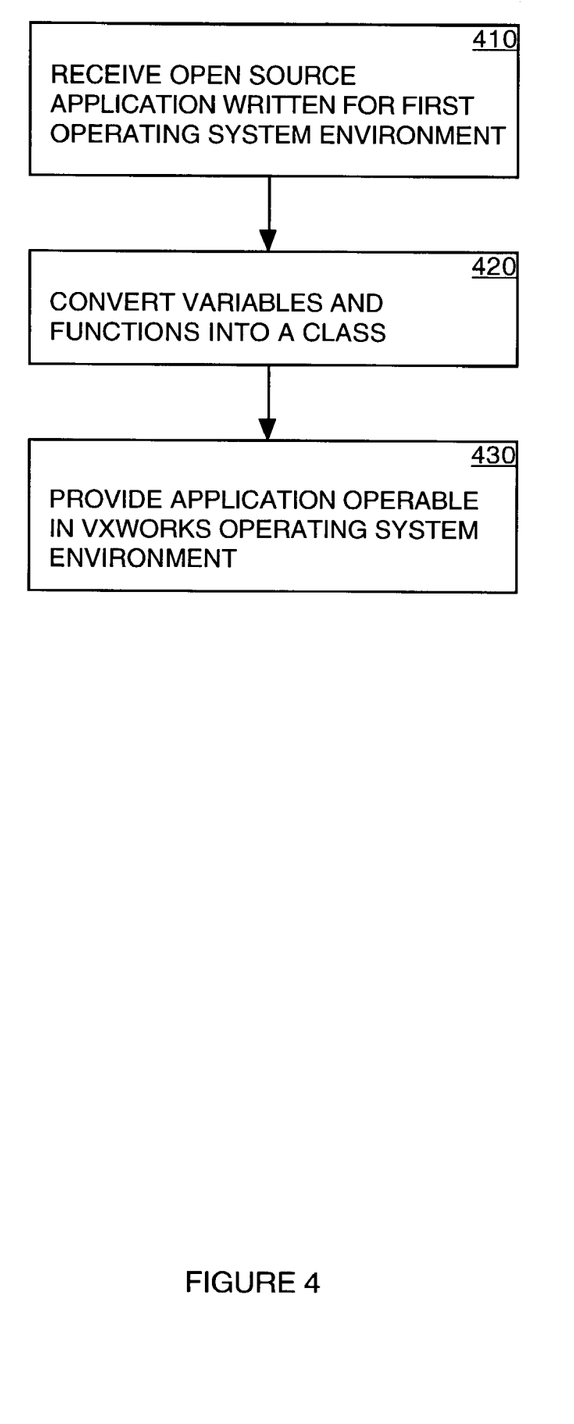
FIG. 4 shows a flow diagram of a method of porting an application, task, process or the like, in accordance with one embodiment of the present invention.

Referring now to FIG. 4, a flow diagram of a method of porting an application, task, process or the like, in accordance with one embodiment of the present invention, is shown. As depicted in FIG. 4, the method comprises receiving an application, task, process or the like, operable in a first operating system, at step 410. In one embodiment the application, task, process, or the like is written in open source code.

The variables and functions of the application, task, process or the like are then converted into a class, at step 420. The class is an object-oriented construct, such as a C++ programming language construct. When an application, process, task or the like is put inside a class, visibility of global variables and functions are limited to within the class. Hence, variables and functions, which would share a namespace (e.g., been public), have been privatized, to a corresponding application, by use of the class namespace.

Thereafter, the application, task, process or the like, is operable in a second operating system environment, at step 430. In one embodiment the second operating environment comprises VxWorks. Each instance of an application, task, process or the like, now has its own copy of an instance of class variables or functions. Hence, a particular class variable or function is only visible to the application that declared it. Applications are not allowed to read or write to the class namespace of another application. For example, a plurality of users can each run an instance of an application in a VxWorks operating environment simultaneously. Each user will receive back the result corresponding to their respective input.

Embodiments of the present invention advantageously increase the number of applications that operate in VxWorks to include application written in Unix open source. Embodiments of the present invention also reduce the extent of changes to the application code. Embodiments of the present invention also reduce software revision time. Therefore, if changes are made in the corresponding open source, such as reference changes, such revisions are more readily incorporated.

Figure 5A:
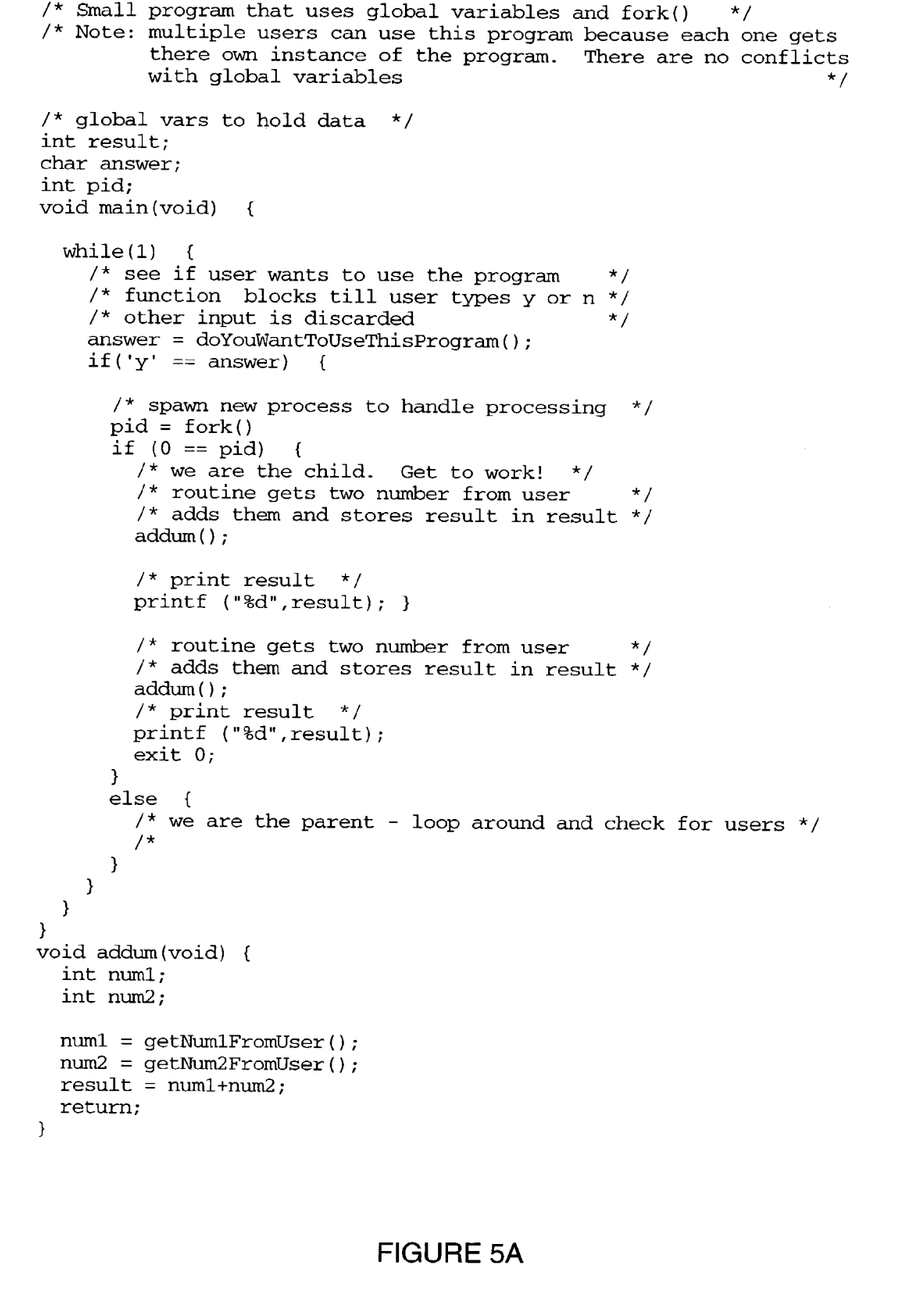
FIGS. 5A and 5B show an exemplary open source code ported for operation in a VxWorks operating environment, in accordance with one embodiment of the present invention.
Figure 5B:
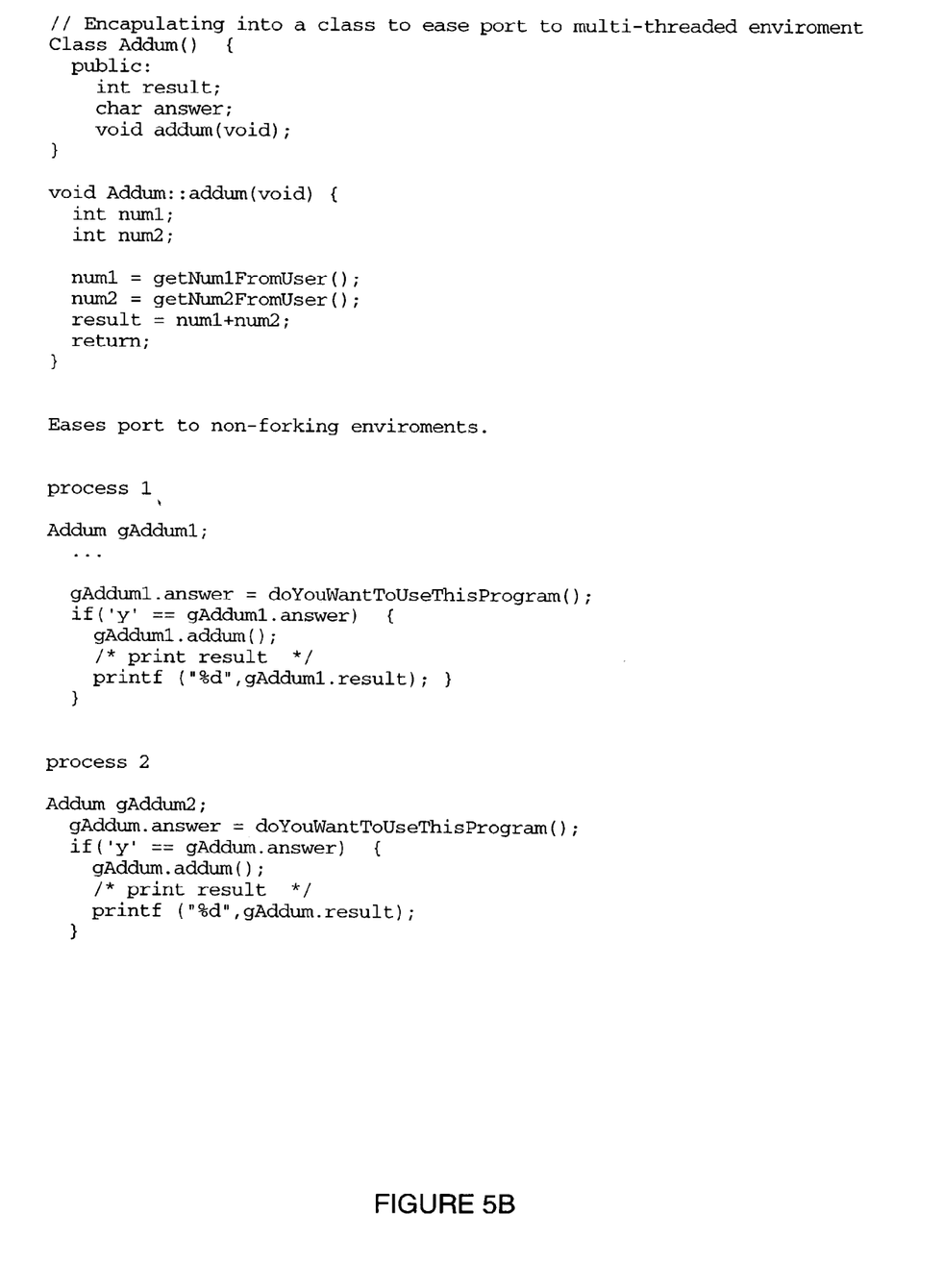

Referring now to FIGS. 5A and 5B, an exemplary open source code ported for operation in a VxWorks operating environment, in accordance with one embodiment of the present invention, is shown. As depicted in FIG. 5A, an exemplary open source code wherein a first number (e.g., variable) and a second number are input by a user. The first and second numbers are added and returned as a result (e.g., function). The fork( ) system call is utilized to spawn each instance of the process. The variables and function are provided for by non-shared namespace.

As depicted in FIG. 5B, the exemplary Unix code has been ported to be operable in a VxWorks operating environment in accordance with one embodiment of the present invention. A first number and second number are input by a user. The first and second numbers are added and returned as a result. The taskspawn( ) system call is utilized to spawn each instance of the process. Normally, the variables and function are provided by shared namespace.

Porting code, according to the present embodiment, from a non-shared namespace operating system to the shared namespace of VxWorks comprises encapsulate the code from the non-shared name space operating system into a class. Each instance of the process creates a class instance, which is called an object. Each object for each instance of the application has its own copy of the variables and function. The class namespace is not visible across multiple applications, tasks, processes, and the like. Hence, multiple applications can be run in parallel, without confusion among the variables. When multiple instances of the application are initiated, distinct results for each instance are returned.

Figure 6:
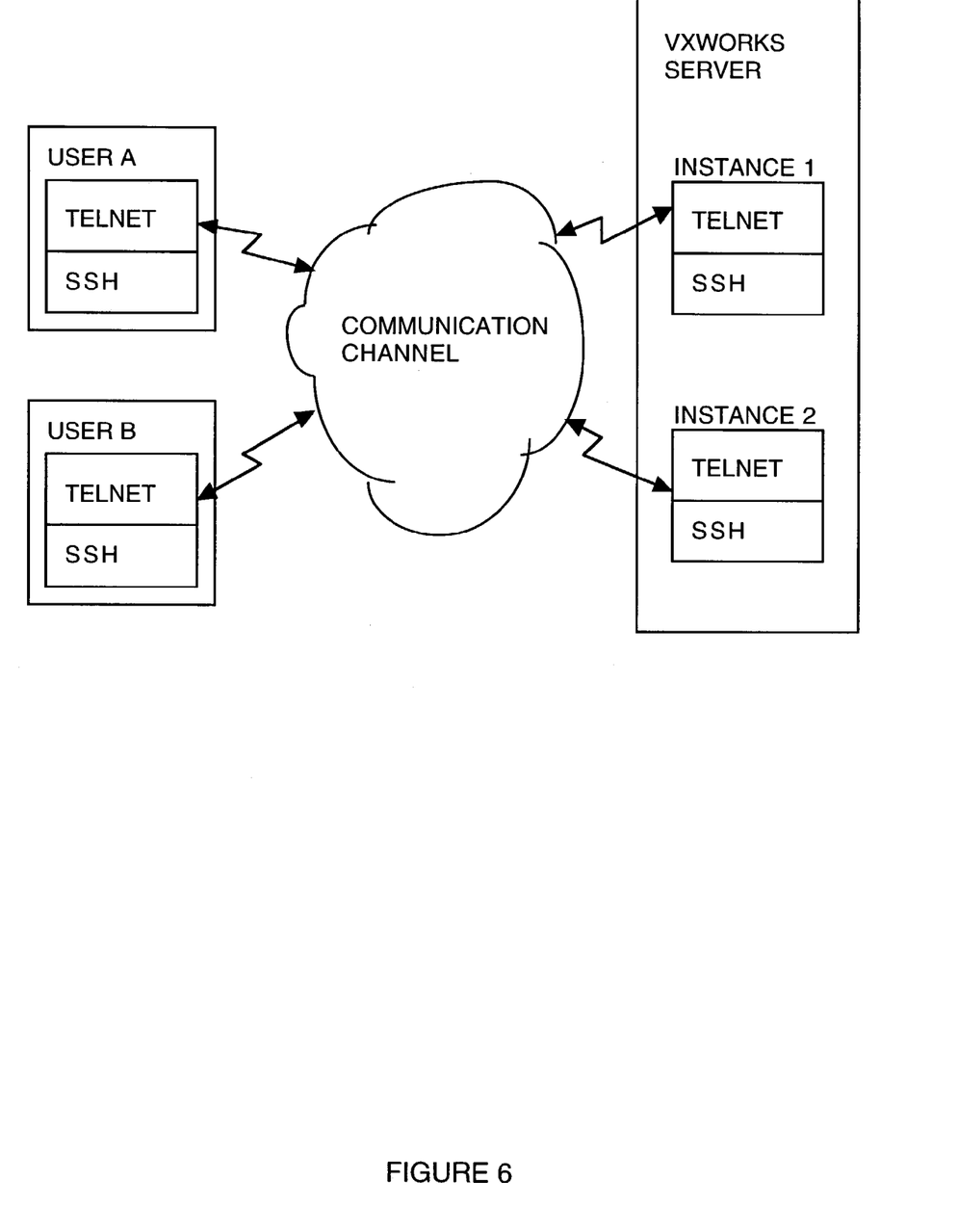
FIG. 6 shows a block diagram of an exemplary communication network, in accordance with one embodiment of the present invention.

Referring now to FIG. 6, a block diagram of an exemplary communication network, in accordance with one embodiment of the present invention, is shown. As depicted in FIG. 6, the communication network comprises a plurality of user devices, a communication channel, and a VxWorks server. The plurality of user devices are communicatively coupled to the VxWorks server via the communication channel.

In one implementation, the users may connect to the VxWorks server utilizing a telnet protocol. The telnet provides for logon with a password. However, the telnet connection is not secure. Someone snooping on the network can see anything that goes on the wire.

One solution is to utilize a virtual private network connection (VPN) to provide for a secure transaction. A VPN client application is run on a user device (e.g., personal computer) and a VPN server application is run on a server. The VPN client application and VPN server application communicate with each other following the VPN protocol, which is an internet protocol. However, VPN is a relatively heavy application in that it requires a lot of setup and the like.

Alternatively, a secure shell (SSH) may be utilized. The secure shell is a relatively lightweight application. An SSH client application is run on a user device (e.g., personal computer) and an SSH server application is run on a server. The SSH client application and the SSH server application communicate with each other following the secure shell protocol, which is a session protocol. Hence, the SSH is a session-by-session security feature. The telnet protocol is then run over the secure shell protocol.

OpenSSH is one implementation of the SSH protocol written in open source code which utilizes features provided for by a Unix operating environment, but not supported by a VxWorks operating environment. VxWorks is a primitive operating system as compared to Unix. VxWorks was designed to be as light as possible, and therefore does not implement all the features of a full operating system like Unix.

VxWorks differs from the Unix operating system in a number of ways. First, there is no memory protection between different programs in VxWorks. Secondly, all global variables are visible to all the tasks running in the system. In Unix, the global variable is only visible to the process that declares the given global variables.

However, OpenSSH can be ported to be operable in a VxWorks operating system without having to substantially re-write the software code of OpenSSH. In accordance with one embodiment of the present invention, the OpenSSH code is converted into a class. As a result, multiple instances of the ported OpenSSH protocol may be provided by the VxWorks server.

Figure 7:
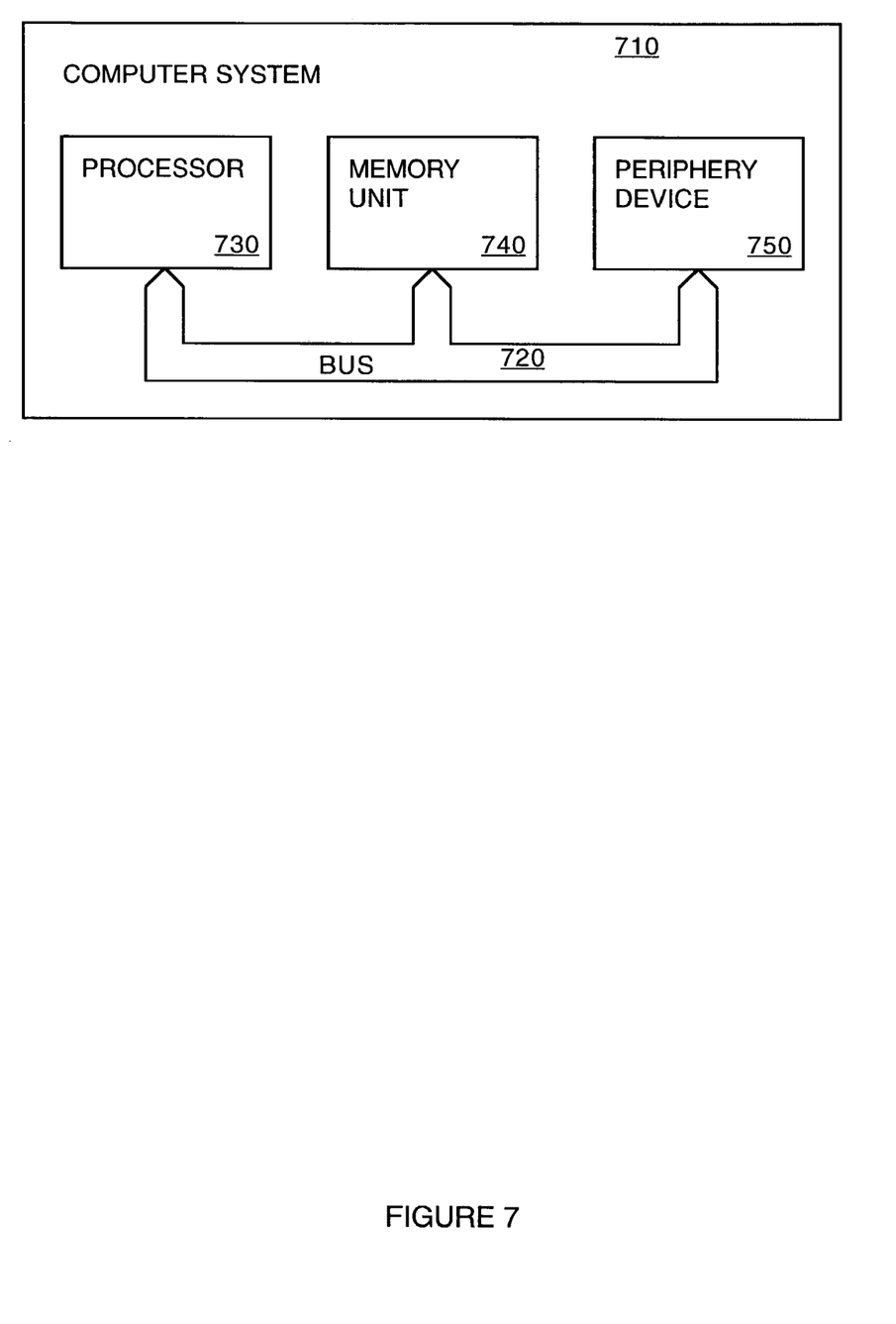
FIG. 7 shows an exemplary computer system for performing embodiments of the present invention.

Referring now to FIG. 7, an exemplary computer system for performing embodiments of the present invention, is shown. As depicted in FIG. 7, the exemplary computer system comprises an address/data bus 720 for communicating information and instructions. One or more processors 730 are coupled with the bus 720 for processing information and instructions. A memory unit 740 is also coupled to the bus 720 for storing information and instructions for the processor(s) 730. The memory unit 740 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like. Optionally, the computer system 710 may include peripheral devices 750 (e.g. display, keyboard, pointing device, speaker, and the like) coupled to the bus 720.

Certain processes and steps of the present invention are realized as a series of instructions (e.g. code) that reside on a computer-readable medium, such as the memory unit 740, and are executed by the processor 720. When executed, the instructions cause the processor 720 to port an application, process, or the like operable in a first operating environment into code operable in a second operating environment.

In one embodiment, the application, process, or the like, operable in a first operating environment, is communicated from a computer-readable medium, such as the memory unit 740, across the bus 720 to the processor 730. In one implementation, the application, process, or the like is written in open source code operable in a Unix operating environment. The open source application, process, or the like is ported, in accordance with the present invention, for operation in a VxWorks operating environment.

The processor, in response to the series of instruction, encapsulate the code of the application, process, or the like is into a class. The class is an object-orientated programming construct. In one implementation, the object-orientated programming construct is a C++ construct. As a result, the non-shared namespace of the application, process or the like, is converted into a class namespace. The class namespace is limited to an instance of the class and is not shared among different tasks, classes, instances, or the like. The ported code may then be transmitted from the processor 730 over the bus 720 to the computer-readable medium, such as the memory unit 740. The computer-readable medium stores the ported code encapsulated into a class, for subsequent loading and/or use in a VxWorks operating environment.

What is claimed is:

1. A method of porting software comprising:
   receiving a set of code that is operable in a first operating environment, wherein at least one instruction of said set of code conventionally requires rewriting to be operable in a second environment;
   converting said set of code into a class resulting in a converted set of code, wherein said converted set of code is capable of operating in said second operating environment without requiring rewriting of any instruction associated with said set of code; and
   providing said converted set of code to a second operating environment.

2. The method according to claim 1, wherein said set of code consist of one of an application, a process, and a task.

3. The method according to claim 1, wherein said first operating environment comprises a Unix operating environment.

4. The method according to claim 1, wherein said second operating environment comprises a VxWorks operating environment.

5. The method according to claim 1, wherein said set of code comprises a set of open source software code written for a non-shared namespace environment.

6. The method according to claim 1, wherein said class comprises an object-oriented construct.

7. The method according to claim 6, wherein said object-oriented construct comprises a C++ programming language construct.

8. A computer-readable medium having instructions which when executed by a computer system implements a process of converting an application into an encapsulated application using a class that encapsulates said application, wherein said application is operable in a first operating environment but is not operable in a second operating environment without conventionally requiring rewriting of at least one instruction of said application and wherein said encapsulated application can operate in said second operating environment without requiring rewriting.

9. The computer-readable medium according to claim 8, wherein encapsulating an application into a class comprises converting a variable into a class variable.

10. The computer-readable medium according to claim 8, wherein encapsulating an application into a class comprises converting a function into a class function.

11. The computer-readable medium according to claim 8, wherein encapsulating an application into a class comprises converting a non-shared namespace into a class namespace.

12. The computer-readable medium according to claim 8, wherein said application comprises open source code.

13. The computer-readable medium according to claim 8, wherein said first operating environment comprises a Unix operating environment.

14. The computer-readable medium according to claim 8, wherein said second operating environment comprises a VxWorks operating environment.

15. A computer system comprising: a bus, for communicating information and instruction associated with an application and a porting method, wherein said application conventionally requires rewriting of at least one instruction in order to be ported;
   a processor communicatively coupled to said bus, for processing said information and instructions associated with said application and said porting method, wherein processing said information and instructions encapsulates said application into a class resulting in an encapsulated application without requiring any instruction associated with said application to be rewritten; and
   a memory unit communicatively coupled to said bus, for storing information and instructions associated with said application said porting method and said encapsulated application.

16. The computer system according to claim 15, wherein said class comprises an object-oriented construct.

17. The computer system according to claim 15, wherein said object-oriented construct comprises a C++ programming language construct.

18. The computer system according to claim 15, wherein said encapsulating comprises converting a non-shared namespace of said application into a class namespace.

19. The computer system according to claim 15, wherein said application comprises an open source application.

20. The computer system according to claim 15, wherein said encapsulating comprises converting a variable and a function of said application into a class of said variable and said function.

* * * * *

UNITED STATES PATENT AND TRADEMARK OFFICE
CERTIFICATE OF CORRECTION

PATENT NO. : 7,185,344 B2  Page 1 of 1
APPLICATION NO. : 10/390121
DATED : February 27, 2007
INVENTOR(S) : Rajeev Grover and John Nolan It is certified that error appears in the above-identified patent and that said Letters Patent is hereby corrected as shown below:

On The Title Page, Item (75)
Inventors: change "Grover; Rejeev" to -- Grover; Rajeev --

Signed and Sealed this

Thirteenth Day of November, 2007

JON W. DUDAS
*Director of the United States Patent and Trademark Office*